March 1, 1927.
V. E. THEBAUD ET AL
1,619,550
MACHINE FOR MASHING FRUITS AND VEGETABLES
Filed Jan. 30, 1926
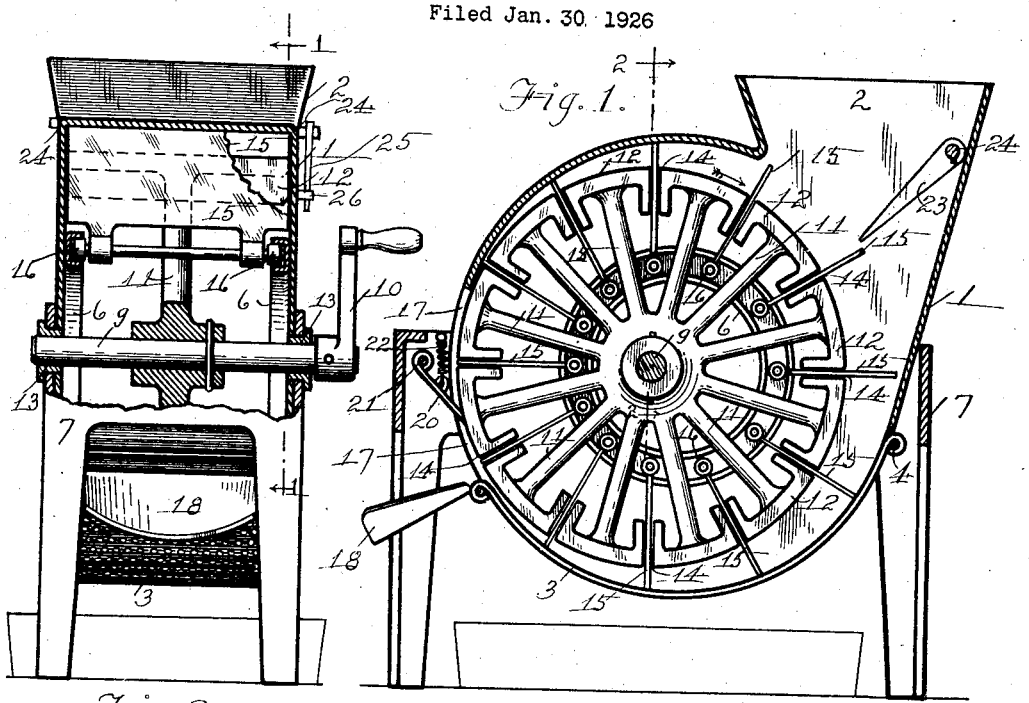
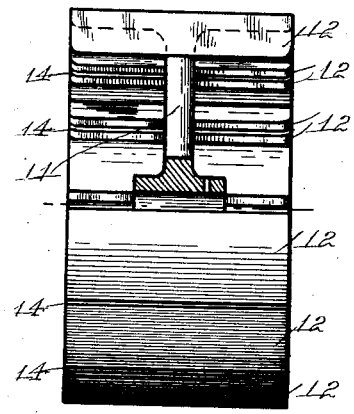
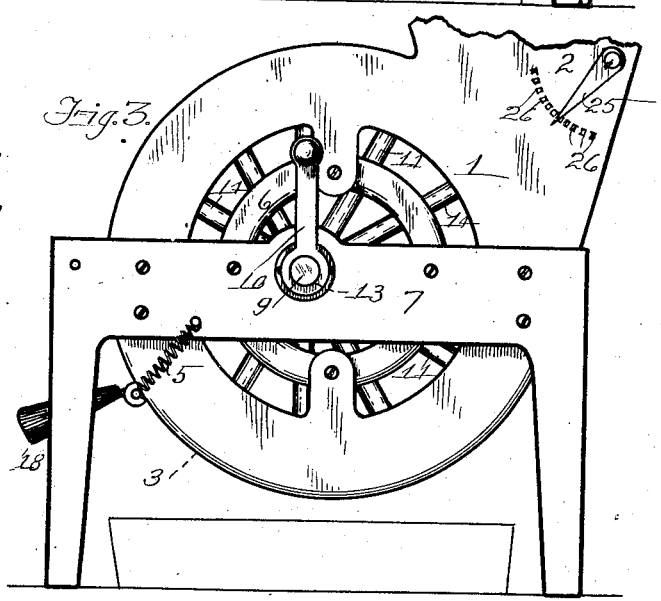
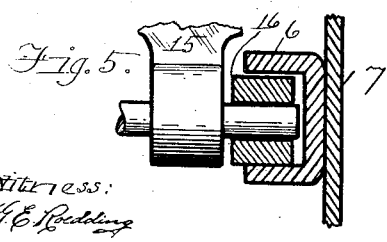
INVENTORS:
Victor E. Thebaud
Sybrant Wesselius
BY
Cyrus W. Rice
ATTORNEY.
Witness:

Patented Mar. 1, 1927.

1,619,550

UNITED STATES PATENT OFFICE.

VICTOR E. THEBAUD AND SYBRANT WESSELIUS, OF GRAND RAPIDS TOWNSHIP, KENT COUNTY, MICHIGAN.

MACHINE FOR MASHING FRUITS AND VEGETABLES.

Application filed January 30, 1926. Serial No. 84,864.

The present invention relates to machines for mashing fruits and vegetables and removing the skins therefrom; and its object is to provide a machine improved in respects hereinafter appearing, whereby such operations may be readily and effectively performed.

This object is attained by, and the invention finds preferable embodiment in, the structure hereinafter particularly described and illustrated by the accompanying drawings, in which:

Figure 1 is a vertical sectional view of a machine for mashing fruits and vegetables and removing their skins, taken on line 1—1 of Figure 2;

Figure 2 is a left-hand end view of said machine, its upper part being shown in vertical section taken on line 2—2 of Figure 1;

Figure 3 is a side view of said machine;

Figure 4 is a left-hand side view of the rotatable element of said machine, the upper half thereof appearing in vertical section taken on line 2—2 of Figure 1; and Figure 5 is a detail view (enlarged) of a portion of one of the vanes; and—in section—of the machine's circuitous guide and the vane's roller travelling therein.

In the embodiment of the invention illustrated by the accompanying drawings, an axially-horizontal cylindrical receptacle 1 has a feeding hopper 2 and a screen portion 3 at its lower side, swingably mounted at 4 adjacent one side, and spring-pressed upwardly at 5 adjacent its opposite side. A circuitous guide 6, or oppositely disposed pair thereof as shown, are mounted on the machine's frame 7, the central axis of this guide being the longitudinal horizontal axis of the receptacle. An element comprising a shaft 9 having a crank 10, and radially-extending arms 11 carrying a cylindrical drum composed of segments 12, is mounted inside the receptacle 1 and is rotatable in bearings 13 by said crank. These bearings 13 are offset from, or eccentrically disposed relatively to, said axis of the guide 6 and receptacle 1. The segments 12 are separated to provide slide bearings 14 between them, in which bearings are slidably carried vanes or blades 15. The inner ends of these vanes engage, as by their anti-friction rollers 16, in the circuitous guide 6, so that as said element is rotated in the direction indicated by the arrow in Figure 1, the vanes are moved outwardly by the circuitous guide, to push their outer edges into contact (or nearly into contact) with the screen portion 3. This action and the approaching movement of the periphery of the segments 12 toward the screen portion 3 mashes the vegetables or fruit in the receptacle and presses their edible portion through the screen portion 3, the skins being carried by the vanes to the vent 17 through receptacle's side, whence they are discharged into a chute 18.

The screen portion 3 may yield under pressure of the work in the machine as may be necessary, by reason of its swingable mounting at 4 and the spring 5. A scraper blade 20 pivotally mounted at 21 and spring-pressed at 22 toward the periphery of the drum's segments 12 serves to remove therefrom any portions of the food adhering thereto.

The opening from the hopper 2 into the receptacle 1 may be enlarged or restricted by the valve member 23 swingably mounted at 24 and having an arm 25 outside the receptacle and yieldingly held in adjusted position between teeth 26.

The invention being intended to be pointed out in the claims, is not to be limited to or by details of construction of the particular embodiment thereof illustrated by the drawings or hereinbefore described.

We claim:

1. In a machine of the character described: a receptacle having a screen portion; a circuitous guide; an element rotatable about an axis eccentric to that of the guide; vanes engaging the guide and severally movable thereby on said element toward the screen portion and independently thereof and of the receptacle.

2. In a machine of the character described: a receptacle having a screen portion and a vent adjacent thereto; a circuitous guide; an element rotatable about an axis eccentric to that of the guide; vanes engaging the guide and severally movable thereby on said element toward the screen portion and independently thereof and of the receptacle.

3. In a machine of the character described: a receptacle having a screen portion; a circuitous guide; an element rotatable about an axis eccentric to that of the guide; vanes engaging the guide and severally movable thereby on said element toward the screen portion and independently thereof and of the receptacle, the screen portion being swingably mounted adjacent one side and spring-pressed adjacent its opposite side toward said element.

4. In a machine of the character described: a receptacle having a screen portion; a circuitous guide; an element rotatable about an axis eccentric to that of the guide and having radially-extending bearings; vanes slidably mounted in said bearings and severally engaging the guide movably thereby toward the screen portion.

5. In a machine of the character described: a receptacle having a valved inlet and a screen portion; a circuitous guide; an element rotatable about an axis eccentric to that of the guide; vanes engaging the guide and severally movable thereby on said element toward the screen portion and independently thereof and of the receptacle.

In testimony whereof we have hereunto set our hands at Grand Rapids, Michigan, this 28th day of January, 1926.

VICTOR E. THEBAUD.
SYBRANT WESSELIUS.